Dec. 1, 1931.  R. S. TROTT  1,834,879
ENGINE MOUNTING
Filed July 12, 1929    2 Sheets-Sheet 1

INVENTOR.
Rolland S. Trott

Dec. 1, 1931.   R. S. TROTT   1,834,879
ENGINE MOUNTING
Filed July 12, 1929   2 Sheets-Sheet 2
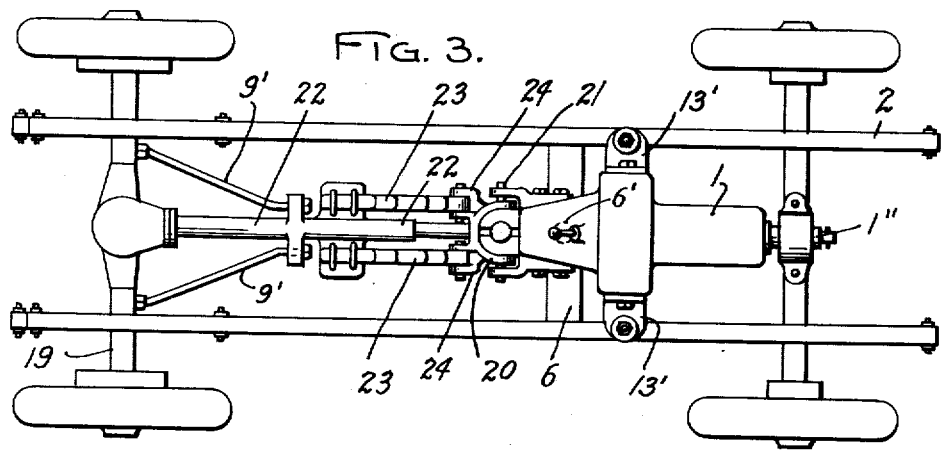
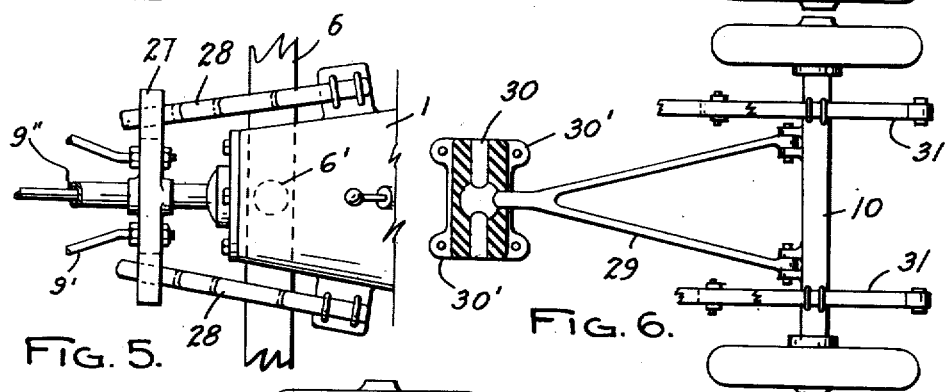
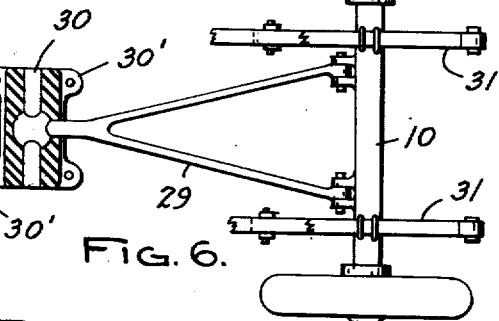
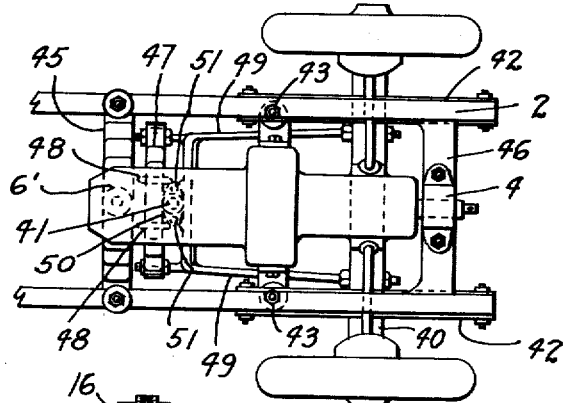
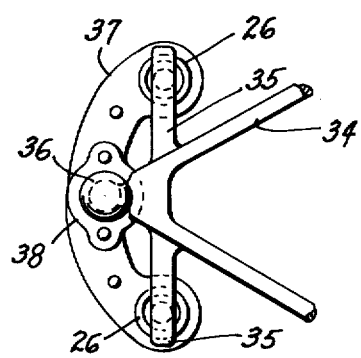
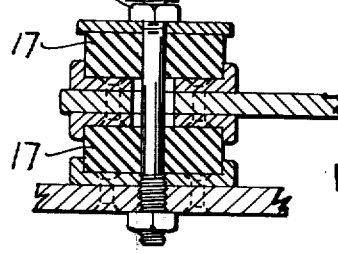
INVENTOR.
Rolland S. Trott Patented Dec. 1, 1931

1,834,879

UNITED STATES PATENT OFFICE

ROLLAND S. TROTT, OF DENVER, COLORADO

ENGINE MOUNTING

Application filed July 12, 1929. Serial No. 377,807.

My invention relates to automotive vehicles, and more especially to the power plant, or engine mountings of automotive vehicles, and is an improvement over my former inventions, patent applications for which were filed August 24th, 1928 and November 24th, 1928, the serial numbers being 301,819 and 321,634 respectively.

In the first of said former inventions the entire weight of the power plant was carried on the axles and independent of the ordinary frame and the body of the vehicle.

In the second of my former inventions, the weight of the power plant or engine was carried partly upon one of the axles and partly upon the frame.

Both of those constructions are adapted to transmit the torque re-action of the engine directly to the axle, without its passing through the frame or body, and thereby relieve the frame and body of all engine sensation due to the torque re-action.

In both of my former inventions there was a slight differential movement between the power plant or engine unit and the frame, which was held within certain limits by rubber bumpers, shock absorbers, or other means.

It is the object of this invention to provide a construction in which substantially the entire weight of the engine unit is supported upon the frame and the engine unit is connected to the frame in a manner not capable of transmitting torque re-action to the frame, and in which the engine unit is connected to one of the axles in such a way as to transmit to said axle substantially all the torque re-action of the engine unit through a resilient connection.

A further object is to provide such an engine mounting and torque re-action connection, in which the engine unit is maintained within reasonable limits of its normal position with respect to the frame by normally inactive limiting means which co-operate with the frame when such limits are exceeded.

In the drawings, which are not in true proportion and which are in parts exaggerated for the sake of clearness;—

Figure 3 is a plan view showing a modified form of construction.

Figure 4, Figure 5, Figure 6 and Figure 8 show details of modified forms of the torsion reach connection with the power plant or engine unit.

Figure 7 is a view showing a modified form as applied to a front wheel drive vehicle.

Figure 9 is a detail showing one form of rubber mounting.

Figure 1:
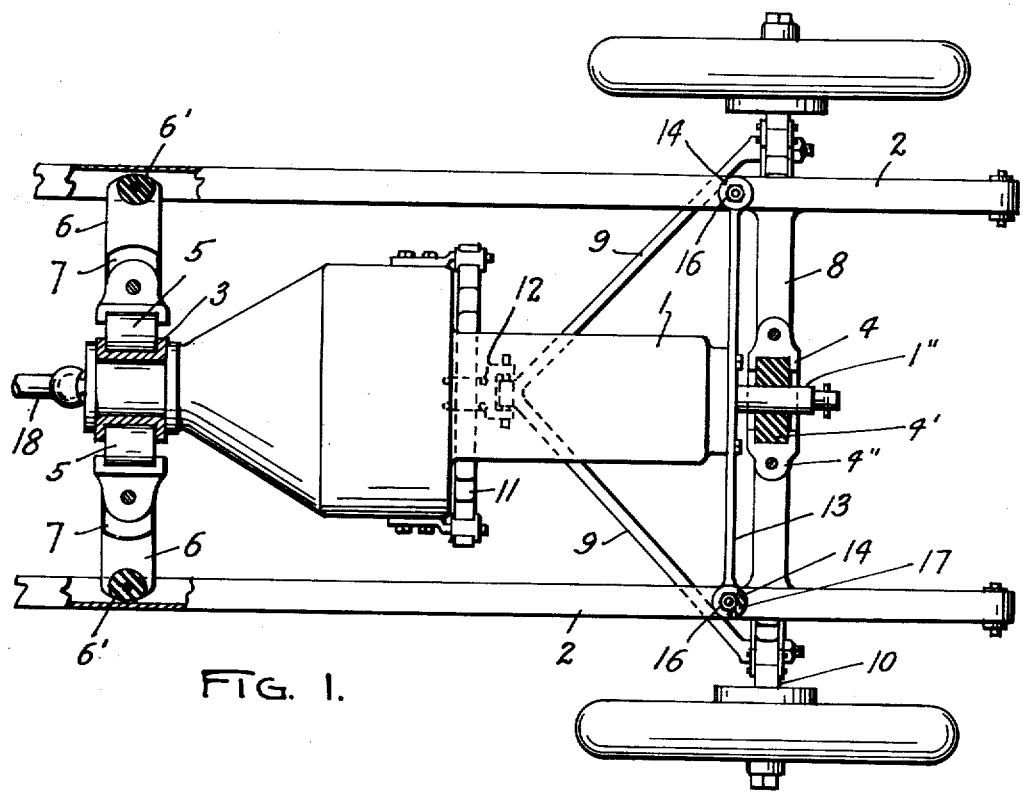
Figure 1 is a fragmentary plan view showing the front portion of the chassis of an automotive vehicle equipped with one form of my present invention.

The engine unit 1 is mounted on the frame 2 by the mountings 3 and 4, which are adapted to provide pivotal movement, or movement substantially equal to pivotal movement. The engine unit in Figures 1 and 2 consists of the engine and clutch housing, the change speed transmission being separate therefrom and not shown.

The rear mounting 3 is provided with the rollers 5 and is supported on the cross member 6 of the frame 2, upon the rubber pad 7.

The cross member 6 is attached to the side members of the frame 2 by the rubber mountings 6', or by mounting such as shown in Figure 9, or by any other proper means of attachment.

Figure 2:
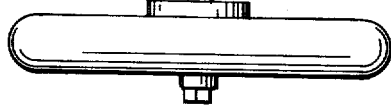
Figure 2 is a side elevation in partial section of Figure 1.

The mounting 4, which receives the engine bracket 1'', is of any of the well known rubber mounting constructions such as the rubber ring 4' in the split bracket 4'' of Figure 1, or of the form shown in Figure 9, and supports the front of the engine unit upon the cross member 8 of the frame 2.

A rubber mounting such as at 4 may be used in place of the mounting 3, if desired; and a pivotal mounting having a ball or roller bearing such as shown at 3 may be used in place of the mounting 4, if desired, and either of them with or without the rubber pad 7.

Or, any other form, type or construction of mounting may be used at either end of the engine unit whether it includes the change speed transmission or is separate therefrom, so long as the result is a complete engine unit mounting that is substantially incapable of transmitting torque re-action to the frame 2 of the vehicle.

Both the front and the rear cross members may be of either the rigid type shown at 6 and 8 in Fig. 1 or the spring type such as shown at 45 in Figure 7, and with or without the use of rubber mountings between them and the frame side members.

The torque reach 9 is solidly attached to the front axle 10 if it is designed to position the front axle against torque re-action; but if semi-elliptic or other forms of springs are used between the axle and the frame which act to position the front axle, such as the springs 31 of Figure 6, then a pivotal attachment such as shown in Figure 6 may be used if desired.

The torque spring 11, Figure 1, is properly attached to the engine unit and carries the torque spring bracket 12, upon which is pivotally mounted the rear end of the torque reach 9 so as to provide pivotal movement of the torque reach 9 to accommodate for the vertical action of the frame springs and the resulting movements of the frame with respect to the axle 10. The torque spring 11 not only acts to resiliently cushion the torque reaction of the engine unit, but also to permit angular movements of the axle 10 with respect to the frame when the vehicle is passing over uneven roads, obstacles or depressions.

The cross piece 13 secured to the engine unit, carries the normally inactive bumpers 14, the clearance with the side frame members of the frame 2 being adjusted by the nuts 16, by variation of the thickness of the rubber pads 17, or in any other proper manner, see Figure 9. The bumpers 14 are similar to the rubber mounting shown in Figure 9 except for this clearance, since when used as a rubber mounting the clearance is eliminated as shown.

The cross piece 13 may be mounted at any other place along the engine unit desired, so long as it will act to limit the angular movement of the engine unit with respect to the frame 2. And, instead of extending in both directions from the engine unit, it may be made to extend in one direction only, if desired; that is, the rubber bumper or action controller on one of the side frame members may be dispensed with. I prefer the double bumper construction, however.

If desired, instead of a cross piece 13, brackets 13' may be attached to the engine unit to carry the bumpers, such brackets preferably being attached to the flywheel housing of the engine unit, as in Figure 3.

Any of the various types of shock absorbers or spring control devices, friction, hydraulic, pneumatic or any combination of them may be used in addition to the normally inactive rubber bumpers or in place of them, as desired, so long as the result is the proper limiting of the angular or pivotal movement of the engine unit with respect to the frame.

It will now be seen that as the engine turns the shaft 18, the reaction to the torque thus transmitted will be taken by the torque reach 9 directly to the axle 10, being cushioned by the torque spring 11, the orbital or floating cushioning movement of the engine unit being permitted by the mountings 3 and 4 and the vertical and angular movement of the axle 10 with respect to the engine unit being permitted by the connection between the engine unit and the reach 9.

Since the necessary slight alterations required in the throttle, spark, clutch, brake, radiator, exhaust pipe, pedals, pedal pads and other parts of the vehicle affected, or whose action is affected by the cushioning movement of the engine unit, have been taken up in my former applications and since any intelligent mechanic will at once perceive what is required in this respect, they will not be gone into here.

Since in standard automotive vehicle construction when the engine is separate from the change speed transmission the pedals and the gear shift lever are mounted separate from the engine they will be so mounted in such a case in my present invention.

In case the engine is a unit including the change speed transmission, the pedals and gear shift lever may be mounted on the engine unit as is standard construction in such a case, or they may be mounted upon the frame and properly connected to the engine unit by connections permitting its cushioning movements. But, since this construction was taken up in my former applications and since the necessary details will be obvious to anyone versed in such matters once my inventions are disclosed to him, they will not be gone into further herein.

In Figure 3, in which the engine unit includes the change speed transmission, the torque reach 9' is attached to the rear axle 19.

The front end 20 of the reach is pivotally connected with the engine unit at 21 and the drive shaft is telescopically enclosed in the end 22 of the reach.

The torque springs 23 are properly mounted upon and attached to the reach end 22 and are connected to the brackets 24 of the end 20, acting to cushion the torque reaction in the same manner as the spring 11 shown in Figure 1.

Figure 4:
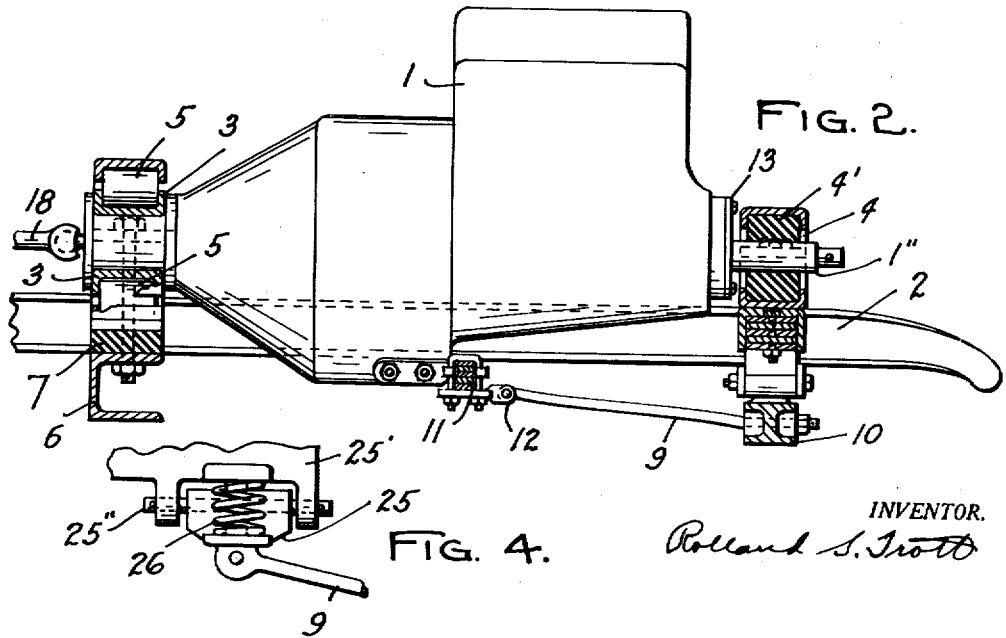

In Figure 4, the bracket 25 is pivotally mounted by the pin 25'' on the bracket 25' of the engine unit and pivotally mounts the pivotally connected reach 9, the spiral torque springs 26 on each side of the pivot 25'' on the engine unit acting to resiliently cushion the torque reaction in the same general manner as that duty is performed by the spring 11, shown in Figure 1.

In Figure 5, the rear reach 9'' is provided with a ball and socket connection with the engine unit and with a cross arm 27 co-acting with the torque springs 28, mounted on the engine unit, to resiliently cushion the torque, the rear of the engine unit being mounted on the cross member 6 by the rubber mounting 6' or in any other proper manner that will not transmit torque to the frame. The engine unit in this construction includes the change speed transmission.

In Figure 6, the reach 29 is provided with a cross piece 30 in a rubber mounting which is held to the engine unit by a supporting bracket 30' properly attached to the engine unit, the resilience of which mounting acts to permit the vertical as well as the angular movements of the axle 10 and also to cushion the torque reaction of the engine unit.

The axle ends of the reach 29 are pivotally mounted, since the semi-elliptic springs 31 act to position the axle in this construction.

In Figure 7, the engine unit, which includes the change speed transmission is pivotally mounted at the rear on the spring cross frame member 45, and at the front on the cross frame member 46. The spring 47 is properly attached to the engine unit as at 48, and at its ends is connected to the torque reach 49, which is properly attached to the front axle 40.

The ball 41 of the reach 49 is properly attached to the engine unit by a cap 50 held in place by the bolts 51. This ball and socket attachment between the reach 49 and the engine unit permits the vertical movements of the axle 40 due to the action of the springs 42, as well as tilting movements of the axle due to irregularities of the road and due to the torque movements of the engine unit, both of which result in the flexing of the spring 47 to a greater or less extent.

In Figure 8, the reach 34, is provided with the ball 36, and the cross arms 35. The bracket 37, which is to be mounted on the engine unit in any proper and secure manner, supports the ball 36, which is held in place by the cap 38, properly secured to the bracket 37.

The springs 26 between the bracket 37 and the cross arms 35, act to resiliently oppose angular movement of the engine due to the torque and also act to permit angular and vertical movements of the axle in going over the roads.

It is obvious that rubber cushions of various forms and construction, flat or leaf or coiled springs, or any other resilient form of connection may be used, or any combination of any or all of them may be used on any of the reach constructions or mountings shown or with any other proper reach constructions or mountings which will transmit the torque from the engine unit to one of the axles which substantially none of it passing through the frame, and still permit the usual vertical and angular axle movements.

And, though I prefer the front reach construction to position the engine unit because of the smaller vertical movement and consequent smaller angular movement of the front axle, the rear reach construction may be used if desired, or in fact both reaches may be used to transmit the torque to their respective axles, or both reaches may be used with but one of them equipped to transmit the torque to its axle.

In any case, and with any reach or engine mounting construction, it can be seen that though the weight of the engine unit is carried on the frame, the engine unit is permitted enough pivotal or similar torque cushioning movement so that it may co-operate with the connection to one or both of the axles to transmit all torque reaction without subjecting the frame to such re-action.

Though I have shown means for limiting the torque cushioning movement of the engine unit with respect to the frame I prefer that such means be so adjusted as to operate only in extreme cases due to excessive angular movement of the controlling axle; and wherever other design and construction features of the vehicle will permit I believe if possible the said limiting means can be dispensed with entirely.

I am fully aware of various modifications and alterations which an intelligent mechanic would perceive once my invention were disclosed to him, but they are no more than mechanical equivalents so long as the engine unit is carried by the frame while the torque is taken up by one or both axles direct without passing through the frame. Therefore, I do not wish to be narrowly limited in my protection, but what I claim as new and desire to protect by Letters Patent, is as follows:—

1. In the mounting of the engine unit of a motor vehicle having axles, springs mounted on the axles, a frame mounted on the springs, means mounting the engine unit upon the frame and permitting pivotal movement of the engine unit with respect to the frame, a reach connected to one of the axles, means forming a universal connection between the reach and the engine unit, and resilient means between the engine unit and the reach and adapted to oppose relative torsional movement between them.

2. In the mounting of the engine unit of a motor vehicle having axles, springs mounted on the axles, a frame mounted on the springs, cushioning means mounting the engine unit upon the frame and permitting approximately pivotal movement of the engine unit with respect to the frame, a reach connected to one of the axles, means forming a universal connection between the reach and the engine unit, and resilient means between the engine unit and the reach adapted to oppose relative torsional movement between them.

3. In the mounting of the engine unit of a motor vehicle having axles, springs mounted on the axles, a frame mounted on the springs, means mounting the engine unit upon the frame and permitting substantially pivotal movement of the engine unit with respect to the frame, axle aligning means connected to one of the axles, means forming a universal connection between the axle aligning means and the engine unit, and resilient means between the engine unit and the axle aligning means adapted to oppose relative torsional movement between them, and normally inactive means adapted to limit the pivotal movement of the engine unit with respect to the frame.

4. In the mounting of the engine unit of a motor vehicle having axles, springs mounted on the axles, a frame mounted on the springs, means mounting the engine unit on the frame and permitting a rocking movement of the engine unit with respect to the frame; cushion means co-operating with the engine unit and the frame and adapted to limit such rocking movement, a reach connected to one of the axles and universally connected to the engine unit, and resilient means adapted to oppose said rocking of the engine unit with respect to the reach.

5. In the mounting of the engine unit of a motor vehicle having axles, springs mounted on the axles, a frame mounted on the springs, rubber cushioning means mounting the engine unit on the frame and permitting rocking movement of the engine unit with respect to the frame whereby substantially no torque re-action is transmitted from the engine unit to the frame, means co-operating with the engine unit and the frame and adapted to limit said rocking movement and to transmit said torque reaction from the engine unit to the frame after a predetermined amount of said rocking movement, a reach connected to one of said axles, means forming a universal connection between the reach and the engine unit, and resilient means connecting the reach and the engine unit and adapted to oppose rocking movement of the engine unit on its mountings with respect to the reach, whereby the torque reaction of the engine unit is transmitted from the engine unit through the reach to the said axle.

6. In the mounting of the engine unit of a motor vehicle having axles, springs mounted on the axles, a frame mounted on the springs, non-metallic cushioning means mounting the engine unit on the frame and permitting a rocking movement of the engine unit with respect to the frame, a reach connected to one of the axles, means connecting the reach to the engine unit and permitting universal movement between them, and resilient means adapted to oppose rocking movement of the engine unit with respect to the reach.

7. In the mounting of the engine unit of a motor vehicle having axles, springs mounted on the axles, a frame mounted on the springs, means mounting the engine unit on the frame and permitting rocking movement of the engine unit with respect to the frame whereby substantially no torque re-action is transmitted from the engine unit to the frame, a reach connected to one of the said axles, means connecting the reach to the engine unit and permitting universal movement between them, and resilient means connecting the reach and the engine unit and adapted to oppose rocking movement of the engine with respect to the reach whereby the torque reaction of the engine unit is transmitted from the engine unit through the reach to the said axle.

8. In the mounting of the engine unit of a motor vehicle having axles, springs mounted on the axles, a frame mounted on the springs, means mounting the engine unit on the frame and permitting a torque cushioning movement of the engine unit with respect to the frame, reach means connected to one of said axles and having a connection with the engine unit permitting a universal movement with respect to the engine unit, and means adapted to cushion the torque movements of the engine unit relative to said reach means.

9. In the mounting of the engine unit of a motor vehicle having axles, springs mounted on the axles, a frame mounted on the springs, means mounting the engine unit upon the frame at two points and permitting substantially pivotal movement between the engine unit and the frame, axle aligning means connected to one of said axles, means connecting the axle aligning means to the engine unit and permitting movement due to the vertical and angular movements of said axle with respect to the frame, and resilient means between the engine unit and the axle aligning means adapted to oppose angular movement of said axle with respect to the engine unit.

10. In the mounting of the engine unit of a motor vehicle having axles, springs mounted on the axles, a frame mounted on the springs, means mounting the engine unit upon the frame adapted to sustain substantially the entire weight of the engine unit upon the frame, but to transmit substantially none of the torque reaction of the engine unit to the frame, and axle aligning means connecting the engine unit and one of said axles adapted to sustain substantially none of the weight of the engine unit and to transmit from the engine unit to said axle substantially all of the torque reaction of the engine unit.

11. In the mounting of the engine unit of a motor vehicle having axles, springs mounted on the axles, a frame mounted on the springs, means mounting the opposite ends of the engine unit on the frame and permitting a transverse torque cushioning movement of the engine unit with respect to the frame, and axle aligning means connected with an axle and having a torsional resilient reaction absorbing connection with the engine unit and permitting vertical axle movements and tilting axle movements in a substantially vertical plane.

12. In the mounting of the engine unit of a motor vehicle having axles, springs mounted on the axles, a frame mounted on the springs, front and rear pivotal mountings for the engine upon the frame, and a reach connected with one of the axles and having a torsional resilient connection with the engine unit.

13. In the mounting of the engine unit of a motor vehicle having axles, springs mounted on the axles, a frame mounted on the springs, means forming front and rear cushion supports for the engine unit upon the frame and providing substantially pivotal movement of the engine unit with respect to the frame, and having a torsional re-action absorbing connection with the engine unit.

14. In the mounting of the engine unit of a motor vehicle having axles, springs mounted on the axles, a frame mounted on the springs, means forming front and rear cushion supports for the engine unit upon the frame and providing substantially pivotal movement of the engine unit with respect to the frame, axle aligning means separate from the frame forming a torsionally resilient engine unit reaction absorbing connection between the engine unit and one of the axles.

15. In the mounting of the engine unit of a motor vehicle having axles, springs mounted on the axles, and a frame mounted on the springs, means mounting the opposite ends of the engine unit upon the frame providing substantially pivotal movement of the engine unit with respect to the frame for the purpose of permitting torque cushioning movements of the engine unit without transmitting same to the frame, means forming a torsionally resilient axle aligning connection between the engine unit and one of the axles to position the engine unit upon the frame, and cushion means between the engine unit and the frame to limit said cushioning movements.

16. In the mounting of the engine unit of a motor vehicle having axles, springs mounted on the axles, a frame mounted on the springs, means forming front and rear supports for the engine unit upon the frame and providing substantially pivotal movement of the engine unit with respect to the frame, and axle aligning means forming a torsionally resilient connection between the engine unit and one of the axles adapted to position the engine unit upon its pivotal mountings.

17. In the mounting of the engine unit of a motor vehicle having axles, springs mounted on the axles, a frame mounted on the springs, means mounting the engine unit upon the frame at two points and providing substantially pivotal movement of the engine unit with respect to the frame, for the purpose of cushioning the torque reactions of the engine unit without transmitting same to the frame, and axle aligning means forming a torsionally resilient connection between the engine unit and one of the axles adapted to oppose pivotal movement of the engine unit with respect to said axle.

18. In the mounting of the engine unit of a motor vehicle having axles, springs mounted on the axles, a frame mounted on the springs, cushion means mounting the opposite ends of the engine unit upon the frame and providing substantially pivotal movement of the engine unit with respect to the frame, for the purpose of cushioning the torque reaction of the engine unit without transmitting same to the frame, and means forming a torsionally resilient axle aligning connection between the engine unit and one of the axles of the vehicle.

19. In a motor vehicle, a frame, axles, springs for supporting the frame on the axles, an engine unit supported at two points on the frame and movable relative thereto, and axle aligning engine unit reaction absorbing means connecting the engine unit and an axle.

20. In a motor vehicle, a frame, axles, springs for supporting the frame on the axles, an engine unit supported at two points on the frame and movable relative thereto, and engine unit reaction absorbing means connecting the engine unit and an axle.

21. In a mounting for an engine unit of a motor vehicle having a frame, axles, springs mounted on the axles, and supporting the frame, means supporting the engine unit on the frame and permitting a rocking movement of the engine unit with respect to the frame, and a reach connected with one of the axles at spaced points and having a torsional resilient connection with the engine unit.

22. The combination with a motor vehicle frame, axles therefor, and a floating engine unit, of two longitudinally spaced mountings supported by the frame approximately in the longitudinal central vertical plane of the engine unit and carrying said engine unit, at least one of said mountings being non-metallic and yieldable, said mountings being so constructed and arranged as to provide for approximately floating orbital movement of the engine unit relative to the frame under impulses due to the operation of the engine unit, and an engine unit reaction absorbing means connecting the engine unit and one of the axles.

23. The combination with a motor vehicle frame, axles therefor, and an engine unit, of two spaced mountings supported by the frame and carrying the engine unit and providing for orbital movement between the engine unit and the frame of the vehicle under the impulses incident to the operation of the engine unit, the longitudinal center of gyration and axis of rotation of the engine crank shaft approximately coinciding at at least one point, at least one of said mountings being non-metallic and resilient, said other mounting providing a limited degree of angular movement for one end of said unit, and a stabilizing connection between the engine unit and an axle.

24. The combination with a motor vehicle frame, axles therefor, and an engine unit which has a tendency to oscillatory movement during operation, of two spaced non-metallic and yieldable mountings supported by the frame and carrying the engine unit, said mountings being adapted to yield slightly to such tendency to oscillatory movement of the engine unit with respect to the frame under the impulses of the engine unit when in operation, the axis of the engine crank shaft and of the oscillatory movement of the engine unit approximately coinciding at at least one end of the unit, and axle aligning engine unit reaction absorbing means connecting the engine unit and an axle.

In testimony whereof I affix my signature.

ROLLAND S. TROTT.

approximately floating orbital movement of the engine unit relative to the frame under impulses due to the operation of the engine unit, and an engine unit reaction absorbing means connecting the engine unit and one of the axles.

23. The combination with a motor vehicle frame, axles therefor, and an engine unit, of two spaced mountings supported by the frame and carrying the engine unit and providing for orbital movement between the engine unit and the frame of the vehicle under the impulses incident to the operation of the engine unit, the longitudinal center of gyration and axis of rotation of the engine crank shaft approximately coinciding at at least one point, at least one of said mountings being non-metallic and resilient, said other mounting providing a limited degree of angular movement for one end of said unit, and a stabilizing connection between the engine unit and an axle.

24. The combination with a motor vehicle frame, axles therefor, and an engine unit which has a tendency to oscillatory movement during operation, of two spaced non-metallic and yieldable mountings supported by the frame and carrying the engine unit, said mountings being adapted to yield slightly to such tendency to oscillatory movement of the engine unit with respect to the frame under the impulses of the engine unit when in operation, the axis of the engine crank shaft and of the oscillatory movement of the engine unit approximately coinciding at at least one end of the unit, and axle aligning engine unit reaction absorbing means connecting the engine unit and an axle.

In testimony whereof I affix my signature.

ROLLAND S. TROTT.

CERTIFICATE OF CORRECTION.

Patent No. 1,834,879.  December 1, 1931.

ROLLAND S. TROTT.

It is hereby certified that error appears in the printed specification of the above numbered patent requiring correction as follows: Page 5, line 31, claim 13, after "frame," insert the words " and axle aligning means connected with one of the axles"; and that the said Letters Patent should be read with this correction therein that the same may conform to the record of the case in the Patent Office.

Signed and sealed this 11th day of April, A. D. 1933.

(Seal)

M. J. Moore,
Acting Commissioner of Patents.

CERTIFICATE OF CORRECTION.

Patent No. 1,834,879. December 1, 1931.

ROLLAND S. TROTT.

It is hereby certified that error appears in the printed specification of the above numbered patent requiring correction as follows: Page 5, line 31, claim 13, after "frame," insert the words " and axle aligning means connected with one of the axles"; and that the said Letters Patent should be read with this correction therein that the same may conform to the record of the case in the Patent Office.

Signed and sealed this 11th day of April, A. D. 1933.

(Seal)

M. J. Moore,
Acting Commissioner of Patents.